(12) United States Patent
Delson et al.

(10) Patent No.: US 11,108,674 B2
(45) Date of Patent: Aug. 31, 2021

(54) DATA MANAGEMENT SYSTEM AND METHOD

(71) Applicant: Bank of America Corporation, Charlotte, NC (US)

(72) Inventors: Kevin A. Delson, Woodland Hills, CA (US); Ronald D. Hooper, Charlotte, NC (US); Manu Kurian, Dallas, TX (US); Megan Kelly, Richmond, VA (US)

(73) Assignee: Bank of America Corporation, Charlotte, NC (US)

( * ) Notice: Subject to any disclaimer, the term of this patent is extended or adjusted under 35 U.S.C. 154(b) by 19 days.

(21) Appl. No.: 16/175,077

(22) Filed: Oct. 30, 2018

(65) Prior Publication Data
US 2020/0136952 A1    Apr. 30, 2020

(51) Int. Cl.
*H04L 12/26* (2006.01)

(52) U.S. Cl.
CPC .................................. *H04L 43/50* (2013.01)

(58) Field of Classification Search
CPC ..... H04L 43/50; H04L 9/324; H04L 63/0869; H04L 67/2819
USPC ........................................................ 709/224
See application file for complete search history.

(56) References Cited

U.S. PATENT DOCUMENTS

| | | | |
|---|---|---|---|
| 7,415,617 B2 | 8/2008 | Ginter et al. | |
| 8,015,596 B2 | 9/2011 | Wray | |
| 8,185,473 B2 | 5/2012 | Ginter et al. | |
| 8,468,351 B2 | 6/2013 | Boesgaard Sorensen | |
| 8,751,793 B2 | 6/2014 | Ginter et al. | |
| 8,843,997 B1 | 9/2014 | Hare | |
| 8,949,932 B2 | 2/2015 | Henderson et al. | |
| 9,537,889 B2 | 1/2017 | Kuehnel et al. | |
| 9,578,505 B2 | 2/2017 | Buhler et al. | |
| 9,602,281 B2 | 3/2017 | Hars | |
| 9,681,302 B2 | 6/2017 | Robinton et al. | |
| 9,763,092 B2 | 9/2017 | Buhler et al. | |
| 10,020,932 B2 | 7/2018 | Michiels | |
| 2013/0122821 A1* | 5/2013 | Yeung | H04L 67/2819 455/67.11 |
| 2015/0271150 A1* | 9/2015 | Barnett | G06F 21/73 713/171 |
| 2016/0224978 A1* | 8/2016 | Chou | G06Q 20/06 |
| 2017/0262972 A1 | 9/2017 | Adams et al. | |
| 2017/0293563 A1 | 10/2017 | DeHon et al. | |

* cited by examiner

*Primary Examiner* — Tu T Nguyen
(74) *Attorney, Agent, or Firm* — Banner & Witcoff, Ltd.; Michael A. Springs (57) ABSTRACT

Aspects of the present disclosure are directed to electronic computer implemented methods of data communication. The method may include via a computer-based originating data communication network, receiving a smart data payload including an originating node attribute, an injectable tracking attribute and at least one data element associated with a computer readable record; electronically processing the smart data payload including the ID attribute, the injectable tracking attribute and the at least one data element associated; electronically extracting the injectable tracking attribute to determine a network location and electronically transmitting a data element associated with injectable tracking attribute to the originating data communication network for storage in a computer readable database.

12 Claims, 7 Drawing Sheets

DATA MANAGEMENT SYSTEM AND METHOD

BACKGROUND

Moore's law predicted that the number of transistors on a computer chip would double every two years while the chip's price would remain constant. "Moore's law" meant consumers could buy the same technology two years later for about the same price. Fifty years later, Moore's law prediction has endured to the idea that technology companies have recognized Moore's law as a benchmark they must meet, or fall behind in the market. Patrons have come to expect technological products to be faster, cheaper, and more compact over time. This expectation seems to have driven trends of rapid growth in computing power, smaller devices, the ability to connect to the Internet, and reduction in cost and big data. There is a need to improve the technological processing in the new computing era.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are directed to electronic computer implemented methods of data communication, the method includes via a computer-based originating data communication network, receiving a smart data payload including an originating node data attribute, an injectable tracking attribute and at least one data element associated with a computer readable record; electronically processing the smart data payload including the originating node data attribute, the injectable tracking attribute and the at least one data element associated; electronically extracting the injectable tracking attribute to determine a network location and electronically transmitting a data element associated with injectable tracking attribute to the originating data communication network for storage in a computer readable database.

Aspects of the present disclosure are directed a digital computer system, comprising: at least one computer readable database configured to maintain a plurality of computer readable nodes; and at least one computing device, operatively connected to the at least one computer readable database, configured to: electronically receive a smart data payload including an originating node data attribute, an injectable tracking attribute and at least one data element associated with a computer readable record; electronically process the smart data payload including the originating node data attribute, the injectable tracking attribute and the at least one data element associated; electronically extracting the injectable tracking attribute to determine a network location and electronically transmitting a data element associated with injectable tracking attribute to the originating data communication network for storage in a computer readable database.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
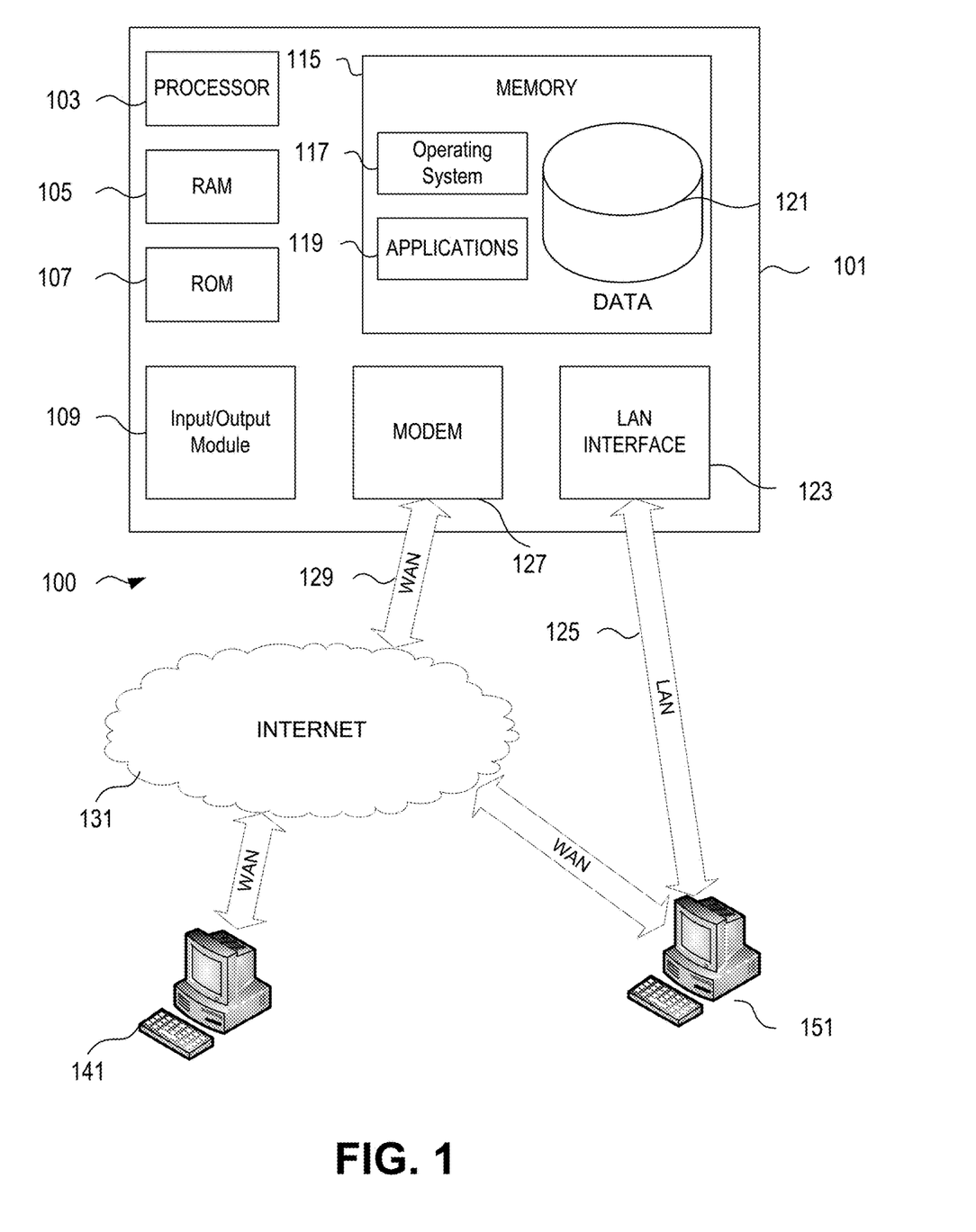
FIG. 1 illustrates a schematic diagram of a digital computing environment in which certain aspects of the present disclosure may be implemented.

FIG. 1 illustrates a block diagram of an specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
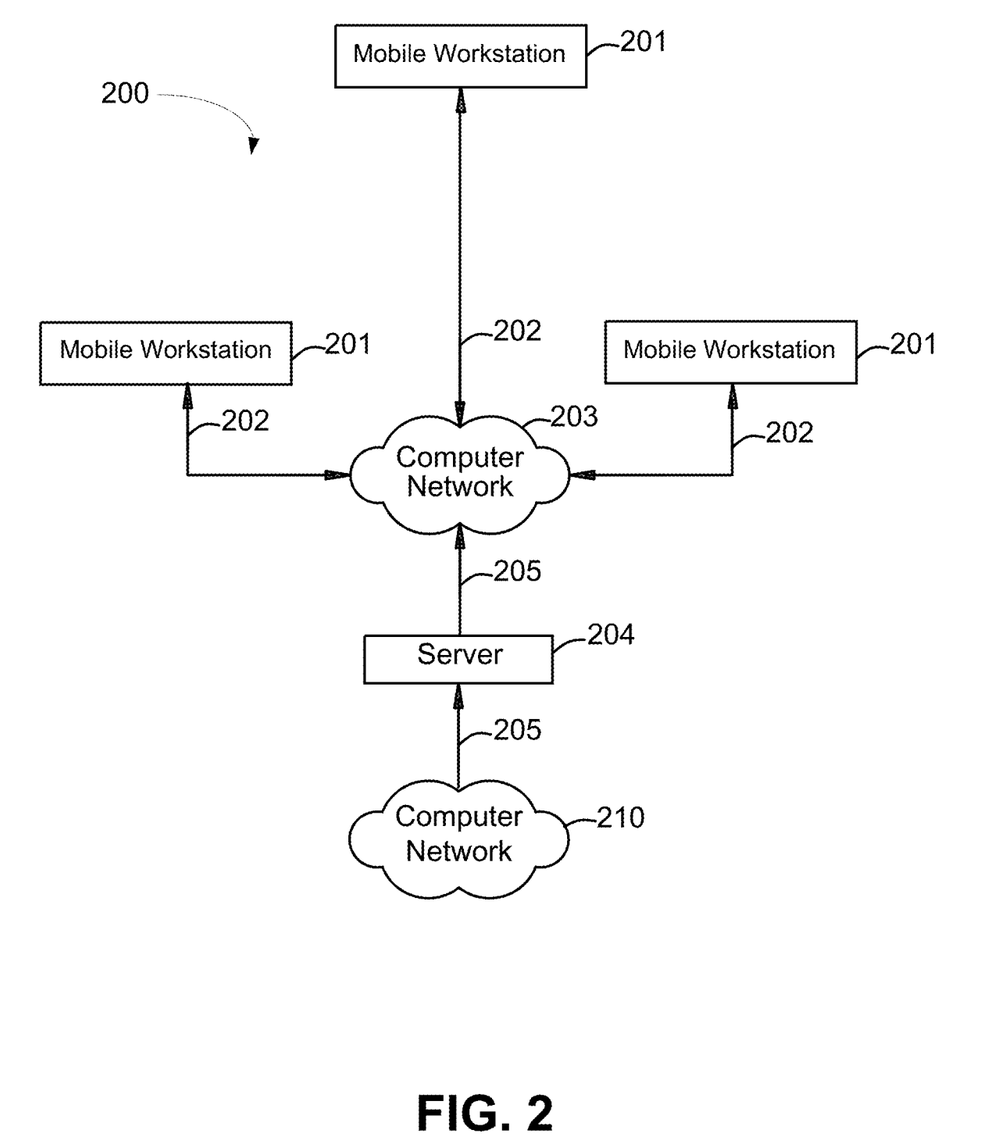
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3A:
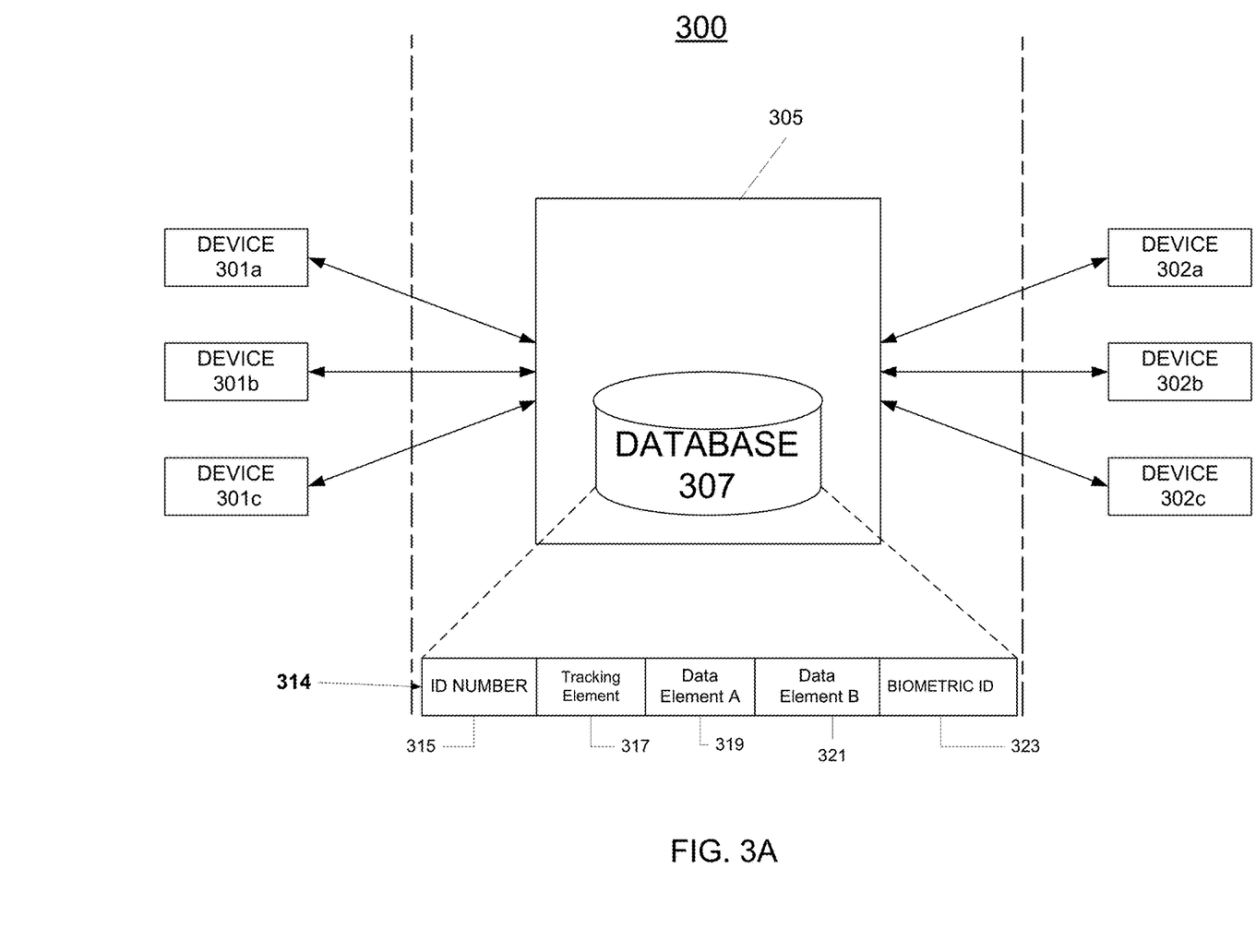
FIGS. 3A and 3B are an illustrative functional block diagram of workstations, database and servers that may be used to implement the processes and functions of certain embodiments.
Figure 3B:
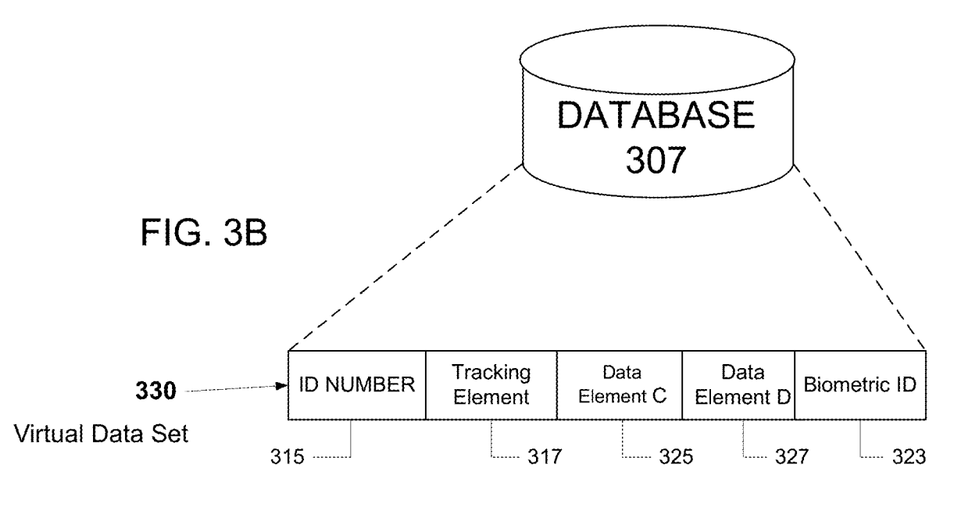

FIG. 3A-3C illustrate an example of representative infrastructure according to some embodiments in the disclosure. The different user devices 301a-301c, via terminals/workstations, electronically communicates with a plurality of different user devices 302a-302c, through the cloud-based processing system 300 including computer network 203, server 305 and electronic database 307. In one embodiment, users execute commands with terminals/workstations to exchange information with the processing system 300 such that the identity of the users are shielded from each other. These terminals may be standard personal computers as are known in the art. In alternative embodiments, the users may use hand-held, tablet computers or other portable electronic devices, such as smart phones or wearable device, as known in the art to communicate with the system 300.

The system 300 includes, for example and without limitation, server 305. Server 305 may include a messaging server, which may be used to receive and send data via email or over the Internet 131. The system 300 may use various attribute data in the Electronic Data Interchange (EDI) format for electronic tracking of specific data as discussed in the foregoing. Server 305 can process an EDI messages sent through the processing system 300 to improve computer processing and machine learning functionality to thereby bring new tangible improved functions to the technology area. A user with device 301a-301c and 302a-302c may securely register to system 300 via a website URL registration service, an in-person registration service, a mail-in registration service, and/or some other registration service. A biometric device system may be included to allow for scanning of an iris of the user, retina scan, face recognition, and/or other types of biometric identification and authentication, including fingerprint scan analysis.

FIGS. 3A and 3B are merely illustrative and the number of, users and/or user terminals, servers and databases is not in any way limited. Furthermore, although various embodiments are described in the context of a single system, one of ordinary skill in the art may appreciate that the described functionality may be implemented across multiple systems. Moreover, a web site may be mirrored at additional systems in the network and, if desired, one or more management systems or other computer resources may be used to facilitate various functions. The computer program at the system 300 includes appropriate screen routines for generating a set of screens that together comprise a graphical user interface for the site.

The system 300 can provide messages in the communication cycle in an authenticated format, secure for each user that would be invited or authorized to be a part of the secure exchange. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, at least two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet. The methods and features recited herein further may be implemented through any number of non-transitory computer readable media that are able to store computer readable instructions. Examples of non-transitory computer readable media that may be used include RAM, ROM, EEPROM, flash memory or other memory technology, CD-ROM, DVD, or other optical disc storage, magnetic cassettes, magnetic tape, magnetic storage and the like.

According to some aspects of the disclosure, in one construction, the system 300 provides electronic messaging back and forth that inputs requests for selective network location from smart data set 314. The network 203 can be sending data using OSI Open Systems Interconnection (OSI) model, including the transport layer (OSI layer 4). Protocol such as TCP/IP used be utilized for transport of data. Referring to FIGS. 3A-3B, in one aspect, system 300 may use various attribute data in for example, in Electronic Data Interchange (EDI) format. In one implementation, the EDI message can use, for example, IPSEC circuitry for secure encrypted communications. The EDI messages can be electronically processed according any number of formats and data sequences. In one case, the smart data set 314 EDI format and smart payload, may include an ID number 315 (originating node attribute), a tracking data element 317, a data element A attribute 319, and a data element B attribute data 321, and optional biometric data attribute data 323. The attribute data 317 pertains to a determined network location, such as originating network, and network 1 through 3 in FIGS. 4 and 6. Biometric ID data attribute data 323 pertains to user biometric information. In the EDI format and payload, the "attribute data" may include ASCII characters in computer readable form or binary complied data, such as biometric data. The ASCII characters or binary data can be manipulated in the software of system 300.

Figure 4:
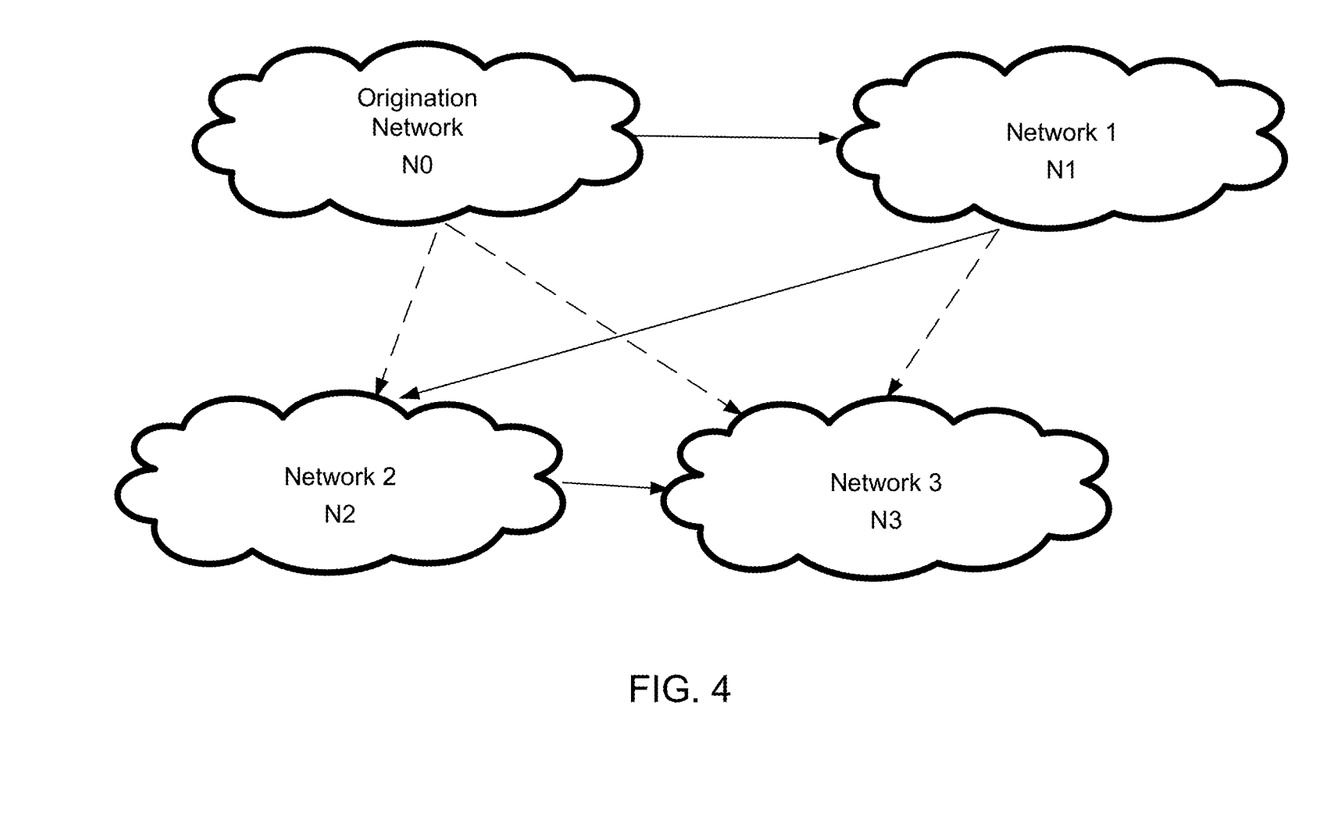
FIG. 4 is an example block diagrams of networks of an illustrative method for in accordance with at least one aspect of the present disclosure.
Figure 5:
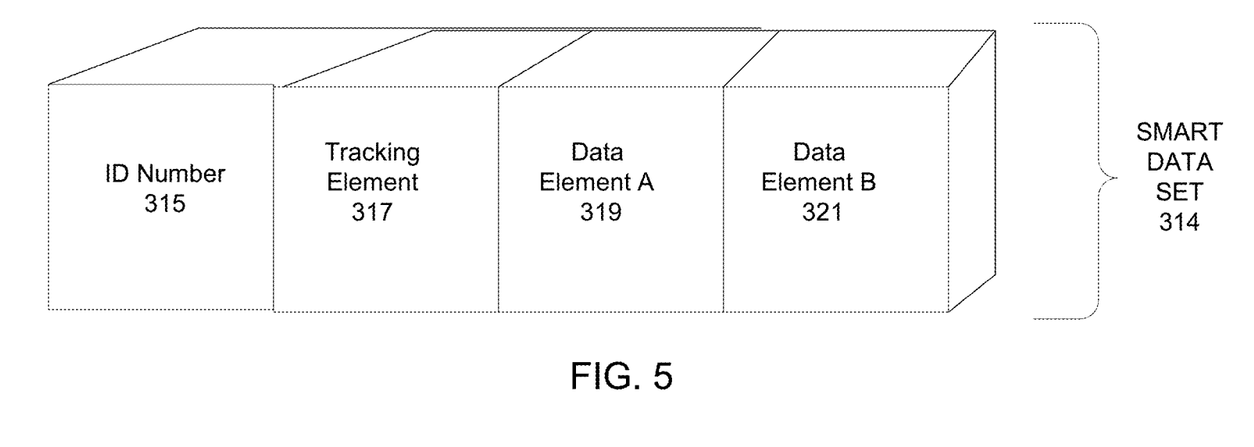
FIG. 5 is an example block diagram of an illustrative smart data set in accordance with at least one aspect of the present disclosure.

One or more of the components in FIGS. 1, 2 and 3A-3B and/or other components, including other computing devices, may implement the steps that follow in the FIG. 4. Referring to FIGS. 3A-3B, 4 and 5, in a general overview, system 300 electronically maintains a plurality of electronic smart data sets 314 for users associated in a computer readable electronic database 121. In such an example, the separate smart data set 314 may be stored within a plurality of memory locations for a non-transitory computer readable memory/database, such as memory 115 and/or RAM 105 in FIG. 1 or electronic database 307 of FIGS. 3A-3B. A user with device 301a-301c electronically communicates with system 300 and devices 302a-302c via system 300.

The steps that follow in FIG. 4 and can be implemented to include a computer readable transaction history or log of the status within process flows that can be maintained or otherwise stored within a memory/database, such as memory 115 and/or RAM 105 in FIG. 1 or electronic database 307 of FIGS. 3A-3B. Regarding the construction with separate memory data attributes of smart data set 314, a data element A attribute 319, and a data element B attribute data 321 can be any appropriate data element pertaining to electronic data records stored and associated with a user or patron. In one example, data element A attribute 319, data element B attribute 321 can be associated with a data of a user profile or transaction history for physical products. Alternatively, data element A 319, data element B 321 can be associated with a data of transactions transfer of electronic store of values. The system 300 automatically inserts an ID number 315, and a tracking data element 317 hidden from the user or patron. In one way, the tracking data element 317 may be considered a customizable injectable smart tracking tag. Once the tracking data element 317 is transferred out of the originating network, a unique IP address of the machine holding the data under TCP/IP protocol can be provided back to the originating network. In some constructions, the IP address can provide a Global Position System (GPS) location (e.g., longitude and latitude) for locating the smart data set 314 in machine storage. In one construction, a virtual record with virtual sub-records may be electronically linked to the ID attribute 315.

In accordance with a data track rule base of system 300, the user can pre-set data trust parameters to activate the tracking data element 317. Such data track rule base parameters can include notification of the data element A attribute 319, and/or a data element B attribute data 321 being send out of the agreed originating network environment. Once the data element A attribute 319, and/or a data element B attribute data 321 are transferred out of the Originating Network to Networks 1-3, for example, then the smart data set 314 with tracking data element 317 can provide network location and IP address data back to the Originating Network via transport layer (OSI layer 4) and stored via a log electronically linked to system 300. In example operation, a user with device 301a-301c and 302a-302c may securely register the rule pre-set data trust parameter to system 300 via a website URL with graphical screen display select various pre-set options.

In one construction, the steps that follow in the FIG. 4 can be implemented where the vendor, customer or other entity can receive inquiries, via an automatic push notification or a report that sends to the authorized inquirer an electronic mail, text messaging via Short Messaging Service (SMS) component of phone, web, or mobile communication systems, using standardized communication protocols that allow the exchange of short text messages between fixed line or mobile phone devices. In another manner, the customer or entities can receive inquiries via a pull format where the inquirer initiates the query at various steps and the notification can be electronic mail or Short Messaging Service technology for cellular phones.

Figure 6:
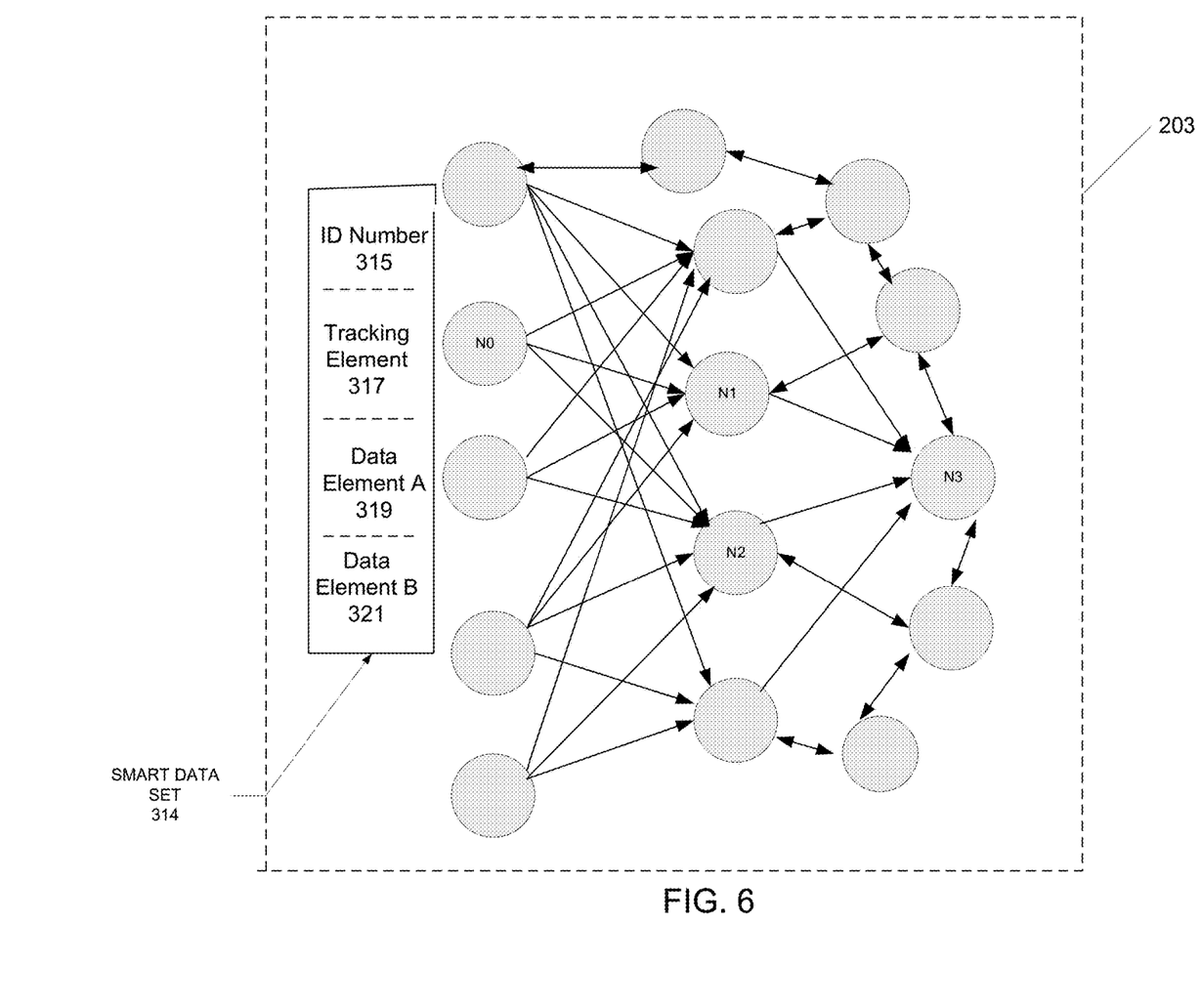
FIG. 6 is an illustrative block diagram of a network with smart data that may be used to implement the processes and functions of certain embodiments.

Referring to FIGS. 4 and 6 process flow of system 300, the various items in network/steps N0-N3, are electronic logically via computer readable instructions linked to electronic attribute data for EDI message processing via system 300 and Networks NO-N3. The system 300 may then employ selective attribute data in the Electronic Data Interchange (EDI) format to form a tokenized/container data form for data transfer. For example, in Step NO, and referring to FIG. 3B, a temporary mirrored smart data set 330 for a plurality of memory locations can be created in the memory/database 307 with at least one ID number 315, and data tracking element attribute 317, a data element C attribute 325, a data element D attribute 327 and a biometric ID attribute 323 of the user can be optionally provided in for enhanced owner identification. Linked smart data set 330 is based the same data of set 315, but is stored to keep an anchor record of the data transferred out of originating network NO. In one example, Data element C attribute 325 can be copy of Data element A attribute 319, and a data element D attribute 327 is copy of a data element B attribute 321. This implementation is provided in the case that the transfer data, data element A attribute 319, data element B attribute 321 might be changed once outside of the originating network. In Step N1, the smart data set 314 has arrived at Network 1 for travel to Network 2. In one example at Network 1, the smart data set 314, tracking element 317 can send back a notification to the originating network linked log and with the ID number 315 and IP address or network location and GPS location. In a further option, notification can be provided via an automatic push notification or a report can send to the authorized user/owner of the smart data set 314 an electronic mail, text messaging via Short Messaging Service (SMS) component of phone, web, or mobile communication systems, using standardized communication protocols that allow the exchange of short text messages between fixed line or mobile phone devices.

The computer technology system 300 provides for message protocols products and packages that communicate seamless on a wide-area network (WAN), a local-area network (LAN), a wireless network, a digital subscriber line (DSL) network, a frame relay network, an asynchronous transfer mode (ATM) network, a virtual private network (VPN). As noted, smart data set 314 moves between various locations and the data elements created at the nodes of networks 1-3, the data element A attribute 319, and/or a data element B attribute data 321 are transferred out of the Originating Network to Networks 1-3. For example, the smart data set 314 with tracking data element 317 can provide network location data back to the Originating Network via transport layer and stored via a log electronically linked in or to system 300. For example, smart data set 314 could travel from Network 1 directly to Network 3. Likewise, smart data set 314 can be transferred directly to Network 2 or Network 3 and the IP address or network location and GPS location can be provided back when the activated by tracking element 317.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. An electronic computer implemented of data communication, comprising:
   via a computer-based originating data communication network, receiving an EDI smart data payload including an originating node data attribute, a trust injectable tracking attribute data and at least one data element associated with a computer readable record in a tunnel mode and transport mode communications link;
   electronically processing the EDI smart data payload including the originating node data attribute, the trust injectable tracking attribute data and the at least one data element;
   electronically extracting the trust injectable tracking attribute data to determine a network location; and
   electronically transmitting a data element associated with the trust injectable tracking attribute data to the originating data communication network for storage in a computer readable database.

2. The method of claim 1, further comprising a step of a transmitting via the EDI smart data payload with an electronic message to a device associated with the trust injectable tracking attribute data.

3. The method of claim 1, further comprising a step of creating a virtual data payload for the EDI smart data payload associated with the computer readable record of the originating data communication network.

4. The method of claim 1, further comprising a step of processing the EDI smart data payload including a biometric ID element associated with the computer readable record.

5. One or more non-transitory computer readable media storing computer executable instructions that, when executed by at least one processor, cause the at least one processor to perform a data communication method, comprising:
   via a computer-based originating data communication network, receiving an EDI smart data payload including an originating node data attribute, a trust injectable tracking attribute data and at least one data element associated with a computer readable record in a tunnel mode and transport mode communications link;
   electronically processing the EDI smart data payload including the originating node data attribute, the trust injectable tracking attribute data and the at least one data element;
   electronically extracting the trust injectable tracking attribute data to determine a network location and
   electronically transmitting a data element associated with the trust injectable tracking attribute data to the originating data communication network for storage in a computer readable database.

6. The one or more non-transitory computer readable media of claim 5, further comprising a step of a transmitting via the EDI smart data payload with an electronic message to a device associated with the trust injectable tracking attribute data.

7. The one or more non-transitory computer readable media of claim 5, further comprising a step of creating a virtual data payload associated with the computer readable record of the originating data communication network.

8. The one or more non-transitory computer readable media of claim 5, further comprising a step of processing the EDI smart data payload including a biometric ID element associated with the computer readable record.

9. A digital computer system, comprising:
   at least one computer readable database configured to maintain a plurality of computer readable nodes; and
   at least one computing device, operatively connected to the at least one computer readable database, configured to:
   electronically receive an EDI smart data payload including an originating node data attribute, a trust injectable tracking attribute data and at least one data element associated with a computer readable record in a tunnel mode and transport mode communications link;
   electronically process the EDI smart data payload including the originating node data attribute, the trust injectable tracking attribute data and the at least one data element;
   electronically extracting the trust injectable tracking attribute data to determine a network location and
   electronically transmitting a data element associated with the trust injectable tracking attribute data to an originating data communication network for storage in a computer readable database.

10. The system of claim 9, wherein the at least one computing device being operatively connected to the at least one computer readable database is configured to further comprise a step of transmitting via the EDI smart data payload with electronic message to a device associated with the trust injectable tracking attribute data.

11. The system of claim 9, wherein the at least one computing device being operatively connected to the at least one computer readable database is configured to further comprise creating a virtual data payload associated with the computer readable record of the originating data communication network.

12. The system of claim 11, wherein the at least one computing device being operatively connected to the at least one computer readable database is configured to further comprise processing the EDI smart data payload including a biometric ID element associated with the computer readable record.

\* \* \* \* \*